3,356,635
ADHESIVE TAPE HAVING CHLORINE CONTAINING TACKIFIER
Eugene Francis Heer, North Plainfield, and Franklin Earl Bitting, Middlesex, N.J., assignors to Johns-Manville Corporation, New York, N.Y., a corporation of New York
No Drawing. Filed July 28, 1965, Ser. No. 475,564
5 Claims. (Cl. 260—32.8)

ABSTRACT OF THE DISCLOSURE

Pressure sensitive adhesive tapes. The adhesive in the tapes described herein contains a chlorine containing elastomer, a urethane gum elastomer, and a chlorine containing tackifying component which is a chlorinated diphenyl or a chlorinated triphenyl.

---

This invention relates to a normally tacky and pressure-sensitive adhesive sheet material and more particularly to a fire resistant and oil-resistant pressure-sensitive adhesive and to sheet materials coated therewith.

Normally tacky and pressure-sensitive adhesives of the rubber-resin type are well known to the industry in the form of an adhesive coating on a backing material in masking tapes, plastic electric tapes, and other tape products. Typical formulae contain crude rubber and rosin or various hydrocarbon resins, polymers or co-polymers of synthetic rubber, polyterpene resins, coumarone-indene resins, and other suitable tackifying resins. These adhesives adhere to most surfaces on mere touch contact therewith. The products, however, have had one distinctly inherent disadvantage and that is, that the general materials used to produce these adhesives have very poor resistance to hydrocarbon solvents, fuels, oils, greases, and the like due to the solvating action of such materials on the components of the adhesives. In addition, such adhesives are generally highly flammable. Hence, in the manufacture of electrical equipment such as oil filled transformers, impregnated cables, and the like which constantly are in contact with oily materials, the manufacturers have been forced to employ fabric wrappings, water-activated gum tapes and other inconvenient and undesirable substitutes in place of the conventional tacky and pressure-sensitive adhesive tapes.

It is therefore a principal object of this invention to provide a new class of adhesive compositions for adhesive tapes which are capable of adhering readily to various surfaces under moderate pressure in the manner of the prior art pressure-sensitive tapes, and which furthermore are insoluble in hydrocarbon solvents mentioned above.

A more specific object of this invention is to provide an adhesive tape product in roll form suitable to wrapping cables and the like which will not loosen or be removed from such cables by prolonged contact with oil or other hydrocarbon solvent solvating materials.

Additional objects and further applicability of the instant invention will become apparent from the disclosure herein.

The above objects have been satisfied and the heretofore disadvantages overcome by providing a new pressure adhesive composition which may be used in combination with available backing to provide an oil-resistant and fire-resistant pressure-sensitive adhesive tape. Specifically, the instant invention involves an elastomer such as neoprene or butadiene with natural rubber, suitable tackifiers, other conventional compound ingredients which are used with adhesives, in combination with a polyurethane gum elastomer.

Neoprene has been commonly used as a base for oil-resistant and flame-resistant coatings and permanent bonding adhesive cements; particular attention is directed to U.S. Letters Patent No. 2,601,016 as illustrative of the art of oil-resistant adhesive tapes. It should be understood, however, and has been borne out by the industry, that attempts to produce pressure-sensitive tapes from neoprene have not been successful because of the tendencies of these materials to crystallize, causing detackification and loss of pressure sensitivity with age. By the instant invention, it has been found that the oil resistant hydrocarbons may be combined with a polyurethane gum elastomer in specific percentage relationships and with plasticizing and tackifying materials to provide an adhesive with good oil resistance, good adhesiveness, good flame resistance, and good aging characteristics.

Examples of chlorine containing elastomeric compounds useful in forming the adhesive in this invention are the polychloroprene rubbers such as Neoprene CRT, Neoprene WRT, Neoprene GN and Neoprene W. It is understood, however, that reclaimed polychloroprene rubbers and similar chlorinated rubber materials may be used in place of a specific neoprene composition. The amount of chlorinated rubber used in the adhesive composition may vary between 10 and 40 parts based on 100 parts total adhesive composition.

As noted hereinabove, tackifying resins are also incorporated in the adhesive of this invention to impart the normal tacky and pressure-sensitive characteristics to the composition. The tackifying component should contain about 10–90% of a chlorine-containing resin possessing flame-proof qualities, with the remainder of other resins. It has been found that the best results are obtained when the chlorine-containing tackifying resin or resins are present in amounts from about 20 to 140 parts per 100 parts of rubber and preferably the amount of 30 to 90 parts per 100 parts of rubber. Advantageously, the chlorine containing tackifying agents, in addition to imparting the tacky characteristics to the adhesive, also contribute to its flame resistance because of its flame-retardant and flame-proof qualities.

Examples of suitable chlorine-containing tackifying resins useful within the scope of this invention include the chlorinated diphenyls sold under the trade name Aroclor. Examples of such chlorinated diphenyls are Aroclor 1268, Aroclor 5460, Aroclor 5442 and Aroclor 1254. Aroclor 1268 is a chlorinated diphenyl, containing 68% chlorine, which is a pale yellow opaque brittle resin having a specific gravity of 1.804 to 1.811 and a softening point of 135° to 160°. Aroclor 1254 is a chlorinated diphenyl, containing 54% chlorine, which is a yellow tinted viscous oil having a specific gravity of 1.538–1.548. Aroclor 5442 is a chlorinated triphenyl, containing 42% chlorine, which is a yellow transparent sticky resin having a specific gravity of 1.432 to 1.447 and a softening point of 48.5° to 53° C. Aroclor 5460 is a chlorinated triphenyl containing 60% chlorine and has a specific gravity of 1.740 to 1.745. Generally the chlorinated diphenyl contain about 20 to 30% chlorine and are characterized within the scope of the above representative materials. The greater the percentage of chlorine, the more brittle and more solid the resin, whereas with the lesser amounts of chlorine, the product is oily and more tacky. Generally, blends of the available chlorinated diphenyls are used so as to provide a balance of the physical properties. When the blend is used, the hard resinous and brittle component tends to reduce the fluidity or softness and permanent adhesive tack of the other so that only a slight pressure-sensitivity remains. Conversely, the oily or soft components of the blend plasticizes the hard brittle ones to obtain the desired adhesive qualities. Preferably, the chlorine-containing tackifying resin component should have a softening point in the range of about 110° F. to 320° F. in order to obtain the desired adhesive characteristics. Other tackifiers which may be used in minor amounts with the chlorinated phenyls include hydrogenated rosin, coumarone-indene resins, terpene resins and phenol-aldehyde resins.

The urethane gum elastomers of the invention are the rubbery urethane reaction products formed from polybasic organic carboxylic acids, polyhydric alcohols, polyfunctional isocyanates and various chain extending agents. Vibrathane 5004 is illustrative and is a polyester urethane rubber, having a Shore A durometer value of about 66, a density of 1.15, a tensile strength of 4200 p.s.i., an elongation at break of 400%, and tensile modulus at elongation of one, two and three hundred percent of about 510, 1420 and 2750 p.s.i., respectively. Other gum elastomers are available and may be used singly or in combination with varying degrees of success. Other commercially available elastomers are Vibrathane 5003 and 5005, Cyanoprene YG, and Elastothane 455. The urethane elastomer should be employed as 1:9 to 9:1 ratio to the chlorine containing elastomer with between 1:3 to 1:1 ratio being preferred.

Various types of fillers may be used in the adhesive composition consistent with prior teachings, and these fillers include materials such as magnesium, carbon black, zinc oxide, antimony oxide, natural whiting and diatomaceous silica. The quantity of filler employed may be varied from 0 to 150 parts per 100 parts of combined elastomer. The composition of the invention usually contains an anti-oxidant.

The adhesive composition may be dissolved in a suitable volatile solvent, e.g., toluene, methyl ethyl ketone, or a blend of these, and applied to a particular desirable backing, after which the solvent is removed by evaporation.

The solids should constitute about 50% by weight of the total of the adhesive composition, but this amount may vary between 40 and 60 percent.

Pressure-sensitive tapes suitable for use on electrical equipment such as motor coils and other items which are constantly being subjected to oil splashes are protectable by applying the adhesive to a suitable backing material such as vinyl film, polyethylene film, polypropylene film, acetate film or polyester film. For applications where the flame resistance is important, a vinyl film backing is preferred. Vinyl film backing tape is especially adaptable for pipeline protection application where resistance to oil is essential.

The invention may be better understood by reference to the following examples within the scope of the invention wherein all parts are given as parts by weight unless otherwise indicated.

*Example I*

The following composition was mixed:

|  | Pounds | Percent |
|---|---|---|
| Neoprene WET | 75.0 | 17.75 |
| Vibrathane 5004 Urethane polymer | 25.0 | 5.92 |
| Zalba Special (fortified phenol) | 2.5 | 0.59 |
| Aroclor 1268 | 10.0 | 2.37 |
| Calcium Carbonate | 10.0 | 2.37 |
| Aroclor 5460 | 40.0 | 9.47 |
| Aroclor 5442 | 35.0 | 8.28 |
| Aroclor 1254 | 15.0 | 3.55 |
| Toluol | 105.0 | 24.85 |
| MEK | 105.0 | 24.85 |
|  | 422.5 |  |

Neoprene was mixed on a cold tight mill for three minutes, after which the polyurethane was added and milled for five minutes. The fortified phenol was added and milled for an additional five minutes, after which time the Aroclor 1268 and carbonate were added and milled. The base from the mill was diced and had a Mooney viscosity of 20±2. Toluol and MEK were added to a Struthers Wells mixer, the diced mill base introduced, the remaining Aroclor resins 5460, 5442, and 1254 added, and the mixture churned for approximately 4 to 6 hours until smooth. A six mil vinyl film was used as the base material and was anchor coated. The adhesive was applied by a knife-over-roll method and produced a coating when dry of between 1.5 and 2 mils.

When tested, the adhesive tape has an adhesion to steel control point of 20 to 28 ounces, an accelerated age factor of 100%, a minimum tensile strength of 20 pounds and a minimum elongation of 175 to 225%.

Tapes of the instant invention were tested with a 60-day oil soak along with presently available commercial materials, whereby the instant tape was the only one to remain intact. All others failed as the oil attacked the components and the adhesiveness was destroyed.

*Example II*

A second adhesive composition was made up as follows:

|  | Percent |
|---|---|
| Neoprene WRT | 18.0 |
| Polyurethane | 6.0 |
| Aroclor 1268 | 2.4 |
| Calcium carbonate | 1.2 |
| Zalba Special (fortified phenol) | 0.6 |
| Aroclor 5460 | 9.0 |
| Aroclor 5442 | 7.8 |
| Aroclor 1254 | 3.0 |
| Polyterpene resin | 1.8 |
| Toluol | 25.15 |
| MEK | 25.15 |

The materials were combined in essentially the same fashion as were the materials of Example I. An adhesive tape was prepared, using a 6-mil vinyl film, combining the same anchor coating with these coatings as used in Example I. The tape was compared with available tapes used in evaluating Example I, designed for oil-resistance and the results are set out below in Table 1.

TABLE 1

|  | Spec. Req. | Example I | Commercial Tape | |
|---|---|---|---|---|
|  |  |  | DB V-10 | Polykem 900B |
| Thickness, inches | 0.010±0.001 | 0.0105 | 0.0108 | 0.0148 |
| Adhesion, lb./in. width | 1 | 1.25 | 2.0 | 3.0 |
| Accelerated Aging Factor, percent min | 50 | 100 | 120 | 70 |
| Indirect Electrolytic Corrosion: |  |  |  |  |
| Maximum individual readings | 500 | 17 | 1 |  |
| Maximum median of readings | 50 | 23 | 1 |  |
| Dielectric Strength—After std. lab. atmosphere conditioning: |  |  |  |  |
| Minimum individual reading | 850 | 1,130 | 1,050 | 1,330 |
| Minimum mean of readings | 900 | 1,190 | 1,100 | 1,410 |
| After High Humidity Exposure: Percent of mean of readings on specimens conditioned in standard lab atmosphere | 90 | *89 | 111 | 108 |
| After Moderate Temperature Exposure: |  |  |  |  |
| Minimum individual reading | 600 | 905 | 793 |  |
| Minimum mean of readings | 650 | 930 | 863 |  |
| After Accelerated Weathering: |  |  |  |  |
| Minimum individual reading | 850 |  | 1,210 | 1,410 |
| Minimum mean of readings | 900 |  | 1,240 | 1,440 |
| After Water Immersion: Percent of mean of readings on specimens conditioned in standard lab atmosphere | 90 | 90 | 100 |  |
| Tensile Strength, lb./in. width |  | 26 | 35 | 28 |
| Elongation, Percent: |  |  |  |  |
| After standard lab atmosphere conditioning | 125–300 | 225 | 230 | 300 |
| After accelerated weathering: Percent of mean of readings on specimens conditioned in standard lab atmosphere | 85 | 87 | *70 | *53 |
| Resistance to Oil (60 days soak): |  |  |  |  |
| Low Temperature Properties at 30% |  | OK |  no tack | no tack |
| Backing |  | vinyl | vinyl | polyethylene |

* Failure.

It is believed the above provides a complete description of the invention in such manner as to distinguish it from other inventions and from what is old, and provides a description of the best mode contemplated of carrying out the invention and thereby complies with the Patent Statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein, but only in accordance with the appended claims, when read in the light of the foregoing description.

What we claim is:

1. A normally tacky and pressure-sensitive adhesive tape having an improved flame and hydrocarbon resistant adhesive comprising (a) 10 to 40% by weight of chlorine containing elastomer selected from the group consisting of polychloroprene elastomers and reclaimed polychloroprene elastomers; (b) urethane gum elastomer in a 9:1 to 1:9 ratio to (a); (c) between 20 and 140 parts per 100 parts (a) of a tackifier component containing between 10–90% of at least one chlorinated polyphenyl selected from the group consisting of chlorinated diphenyls and chlorinated triphenyls; and (d) up to 150 parts filler per 100 parts (a) and (b).

2. A normally tacky and pressure-sensitive adhesive tape having improved flame and hydrocarbon resistance comprising a suitable film backing having coated thereon an adhesive comprising (a) 10–40% by weight of a chlorine containing elastomer selected from the group consisting of polychloroprene elastomers and reclaimed polychloroprene elastomers; (b) urethane gum elastomer in a 1:1 to 1:3 ratio to (a); (c) between 20 and 140 parts per 100 parts (a) of a tackifier component containing between 10 and 90% of at least one chlorinated polyphenyl selected from the group consisting of chlorinated diphenyls and chlorinated triphenyls; and (a) up to 150 parts filler per 100 parts (a) and (b).

3. An adhesive tape as defined in claim 2 wherein said composition is as follows:

|  | Percent |
|---|---|
| Chloroprene | 34–36 |
| Urethane elastomer | 10–12 |
| Chlorinated diphenyl or triphenyl | 40–50 |
| Filler | 3–6 |

4. An adhesive composition comprising (a) between 10 and 40% by weight of a chlorine containing elastomer selected from the group consisting of polychloroprene elastomers and reclaimed polychloroprene elastomers; (b) a gum urethane elastomer in a 9:1 to 1:9 ratio to (a); (c) between 20 and 140 parts per 100 parts (a) of a tackifier component containing between 10–90% of at least one chlorinated polyphenyl selected from the group consisting of chlorinated diphenyls and chlorinated triphenyls; (d) up to 150 parts filler per 100 parts (a) and (b); and (e) between 40 and 60% by weight of the composition of a volatile organic solvent.

5. An adhesive composition comprising (a) between 10 and 40% by weight of a chlorine containing elastomer selected from the group consisting of polychloroprene elastomers and reclaimed polychloroprene elastomers; (b) urethane gum elastomers in a 1:1 to 1:3 ratio to (a); (c) between 20 and 140 parts per 100 parts (a) of tackifier component containing between 10 and 90% of at least one chlorinated polyphenyl selected from the group consisting of chlorinated diphenyls and chlorinated triphenyls (d) up to 150 parts filler per 100 parts (a) and (b); and (e) between 40 and 60% volatile organic solvent.

References Cited

UNITED STATES PATENTS

| 2,988,461 | 6/1961 | Eichel | 117—122 |
| 2,999,769 | 9/1961 | Korpman | 117—122 |
| 3,190,847 | 6/1965 | Mitchell et al. | 260—859 |

MORRIS LIEBMAN, *Primary Examiner.*

L. T. JACOBS, *Assistant Examiner.*